United States Patent [19]

Pisar

[11] 4,093,352

[45] June 6, 1978

[54] WINDOW ADAPTED TO BE FLOODED WITH LIQUID

[76] Inventor: Robert J. Pisar, 2807 Spring Creek Rd., Rockford, Ill. 61107

[21] Appl. No.: 778,496

[22] Filed: Mar. 17, 1977

[51] Int. Cl.² ............................................. G02B 5/24
[52] U.S. Cl. ..................................... 350/312; 52/171; 350/267
[58] Field of Search ..................... 350/312, 267, 3; 52/171, 203, 304; 296/97 F

[56] References Cited

U.S. PATENT DOCUMENTS

| | | | |
|---|---|---|---|
| 2,332,060 | 10/1943 | Colleran | 52/171 |
| 2,378,591 | 6/1945 | Solis | 350/312 |
| 2,439,553 | 4/1948 | Winn | 350/312 |
| 2,571,894 | 10/1951 | Kennelly | 350/312 |
| 3,368,862 | 2/1968 | Dean | 350/312 |
| 3,788,729 | 1/1974 | Lowell et al. | 350/267 |
| 4,044,519 | 8/1977 | Morin et al. | 350/312 |

FOREIGN PATENT DOCUMENTS

| | | | |
|---|---|---|---|
| 2,007,664 | 1/1970 | France | 52/171 |
| 1,578,044 | 7/1969 | France | 350/312 |

*Primary Examiner*—Ronald J. Stern
*Attorney, Agent, or Firm*—Leydig, Voit, Osann, Mayer & Holt, Ltd.

[57] ABSTRACT

A space defined between two face-to-face panes of a window is adapted to be selectively flooded with a colored liquid in order to reduce the transmission of heat and/or light through the window. The window is characterized by the provision of a supply manifold located between the panes and by the manner of delivering liquid to the manifold and into the space to insure against unequal pressures and thereby eliminate the danger of the panes being broken.

5 Claims, 3 Drawing Figures

U.S. Patent  June 6, 1978  4,093,352
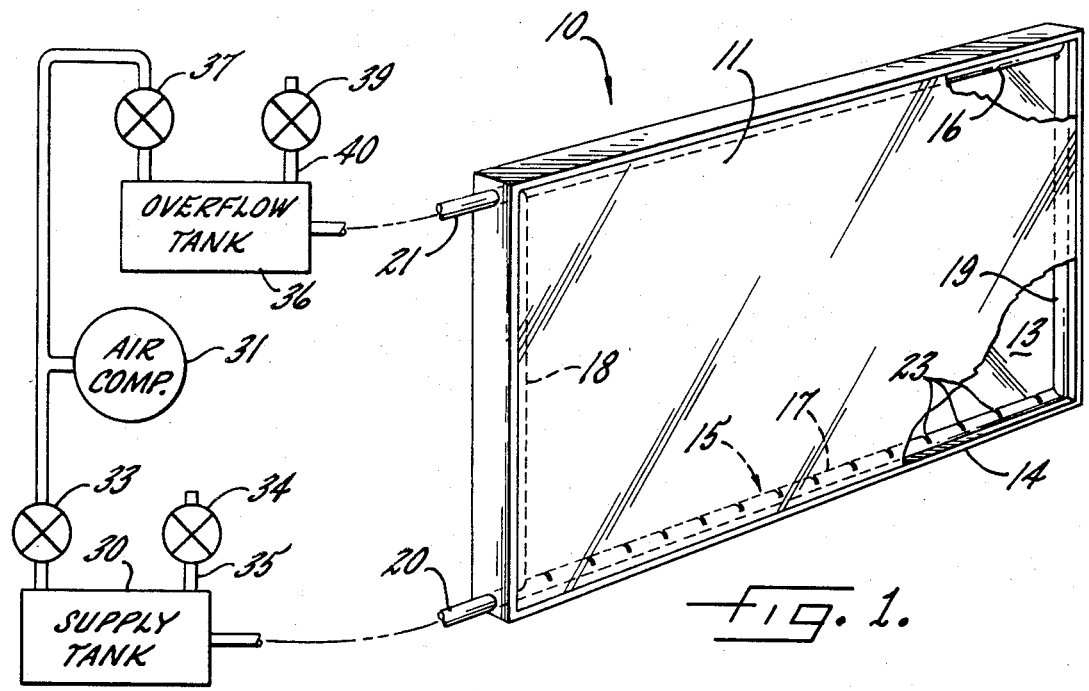
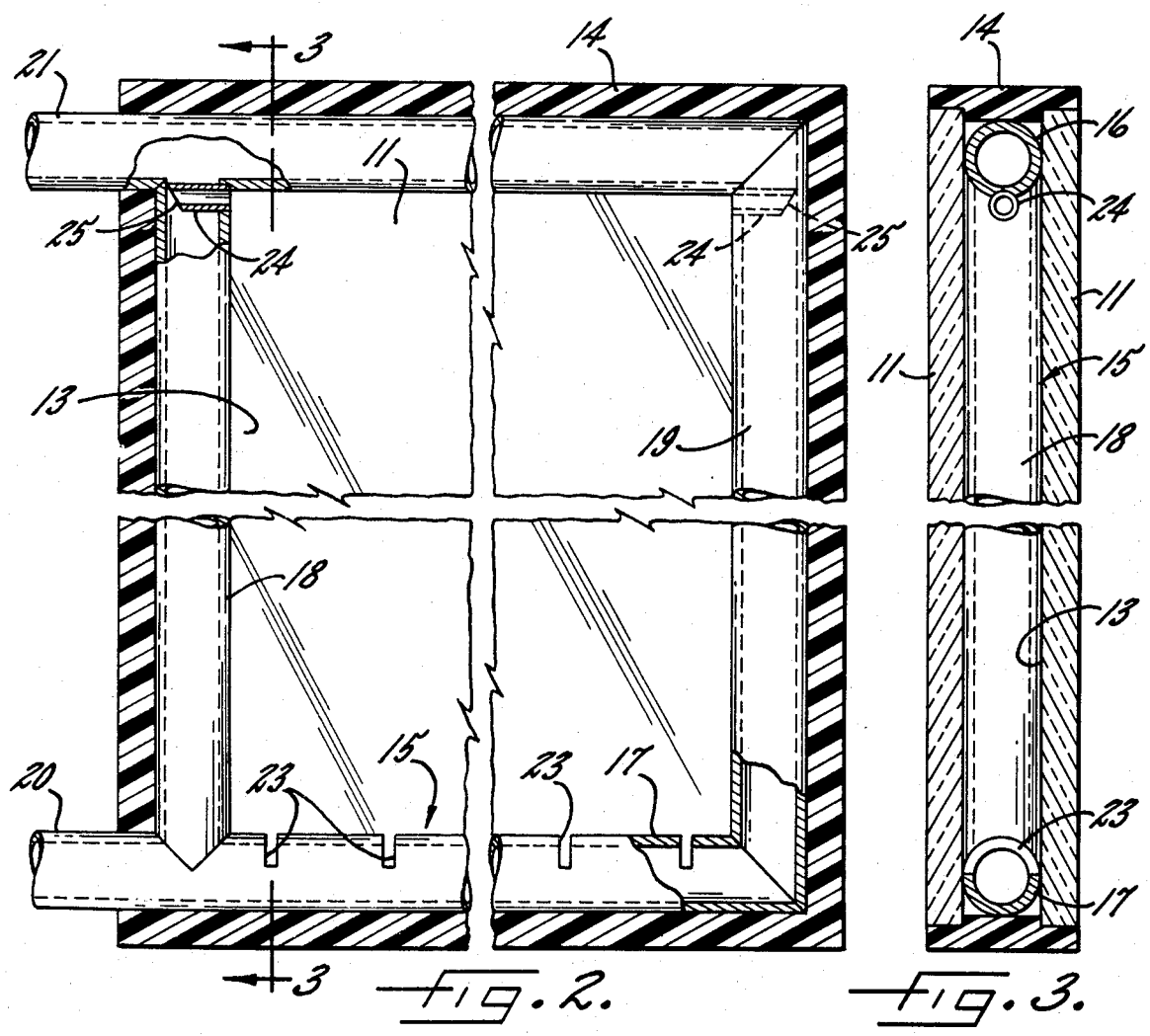
Fig. 1.
Fig. 2.
Fig. 3.

WINDOW ADAPTED TO BE FLOODED WITH LIQUID

BACKGROUND OF THE INVENTION

This invention relates to a window of the type in which the space between a pair of face-to-face panes is adapted to be selectively flooded with liquid in order to reduce the transmission of heat and light through the window. The liquid may be exhausted from the space when conditions are such that it is desirable for the window to transmit heat and light in a normal manner.

Windows of this general type are disclosed in Colleran U.S. Pat. No. 2,332,060; Solis U.S. Pat. No. 2,378,591 and Winn U.S. Pat. No. 2,439,553.

SUMMARY OF THE INVENTION

The general aim of the present invention is to provide an new and improved window of the above character in which a unique liquid supply manifold is located between the two panes and in which the liquid is supplied to an exhausted from the space between the panes in a novel manner in order to keep the pressure exerted on the panes substantially uniform over the entire area of each pane and thereby prevent the pressure from breaking the window.

A further object is to provide a liquid supply manifold which allows gas to escape from the space between the panes as liquid is introduced into the space, which reduces the formation of bubbles in the liquid within the space, and which enables the liquid to be exhausted from the space in such a manner as to leave the panes virtually clear in a short period of time.

The invention also resides in the provision of uniquely arranged supply and overflow reservoirs for the liquid and in the incorporation in the supply manifold of relatively simple and inexpensive gas outlet tubes which enable gas to escape from the space between the panes as the space is filled with liquid while preventing liquid from the overflow reservoir from re-entering the space when the latter is exhausted.

These and other objects and advantages of the invention will become more apparent from the following detailed description when taken in conjunction with the accompanying drawings.

BRIEF DESCRIPTION OF THE DRAWINGS

FIG. 1 is a perspective view of a new and improved window incorporating the unique features of the present invention, the liquid supply system for the window being shown schematically.

FIG. 2 is a fragmentary front elevation of the window shown in FIG. 1.

FIG. 3 is a cross-section taken along the line 3—3 of FIG. 2.

DETAILED DESCRIPTION OF THE PREFERRED EMBODIMENT

As shown in the drawings for purposes of illustration, the invention is embodied in a window 10 which is adapted to be flooded with liquid, preferably a colored liquid, at selected times in order to reduce the transmission of heat and/or light through the window. The window comprises two panes 11 of clear glass or other transparent material disposed in face-to-face relation and spaced from one another by a distance of approximately ½ inch so that a space 13 for liquid is defined between the panes. Herein, a liquid-tight seal is established around the space by joining the edges of the panes to one another with expoxy cement 14 although many other suitable sealing means could be used in lieu of the cement.

In accordance with the present invention, a unique manifold 15 is located between the panes 11 and within the space 13 and is supplied with liquid in such a manner that the pressure exerted on the entire area of each pane is substantially uniform so as to reduce the danger of the panes breaking when liquid is introduced into or exhausted from the space. In addition, the manifold 15 virtually eliminates the formation of bubbles in the liquid and permits virtually all of the liquid to be quickly exhausted from the space 13.

More specifically, the manifold 15 is shaped as a generally rectangular loop and includes four tubular branches 16, 17, 18 and 19 (FIG. 2) made of rigid plastic tubing or other similar material having an outside diameter of approximately ¼ inch and an inside diameter of approximately ⅛ inch. The branches 16 and 17 extend generally horizontally and are located adjacent the upper and lower margins, respectively, of the panes 11. The branches 18 and 19 are disposed in vertical positions adjacent the left and right side margins of the panes. Each side branch 18, 19 is joined at its upper end to the upper branch 16 and at is lower end to the lower branch 17 in such a manner that each side branch establishes liquid communication between the upper and lower branches. One end of the lower branch 17 communicates with a liquid supply line 20 while the corresponding end of the upper branch 16 communicates with an overflow line 21.

Inlet means are formed in the lower branch 17 to enable liquid supplied to that branch to flow into the space 13. Herein, the inlet means are in the form of a series of slots 23 (FIG. 2) which are spaced along the upper side of the lower branch and which open out of such upper side and into the space. The manifold 15 also is equipped with gas outlet means which enable air or other gas in the space 13 to be expelled therefrom as liquid is admitted into the space through the inlet slots 23. In carrying out the invention, the gas outlet means are in the form of small tubes 24 (FIG. 2) which are located adjacent the upper end portions of the side branches 18 and 19, there being one outlet tube for each side branch with each tube having an outside diameter of about ⅛ inch. Each tube 24 extends horizontally through and is cemented to the upper end portion of its respective side branch and is located with its inner end flush with the side branch and communicating with the space 13. Also, the lower sides of the upper branch 16 are recessed to accommodate the tubes and enable the interior of the tubes to communicate directly with the extreme upper end of the space 13.

For a purpose to be described subsequently, the outer end portion of each tube 24 is cut on a bevel and is inclined downwardly and inwardly as indicated at 25 in FIG. 2. Each tube spans the interior diameter of its respective side branch 18, 19 and thus the extreme outer end of the tube contacts the adjacent interior wall of the side branch.

Liquid is delivered to the manifold 15 from a supply reservoir or tank 30 (FIG. 1) which communicates with the supply line 20 leading to the lower branch 17 of the manifold. The reservoir initially contains a suitable liquid —such as denatured alcohol colored with blue or green vegetable dye— which is delivered into the manifold 15 when the tank 30 is pressurized. To pressurize the tank, an air compressor 13 communicates with the tank by way of a solenoid-controlled valve 33, there being a second solenoid-controlled valve 34 associated with the tank and adapted to open and close an air vent 35 leading out of the upper end of the tank.

The compressor 31 also is capable of selectively pressurizing an overflow reservoir or tank 36 which communicates with the line 21 leading from the upper branch 16 of the manifold 15. When a solenoid-controlled valve 37 is opened, pressurized air is delivered from the compressor 31 to the overflow tank 36. Another solenoid-controlled valve 39 is located in an air vent 40 leading from the top of the overflow tank and is adapted to open and close the vent.

To explain the manner of flooding and exhausting the window 10, let it be assumed that all of the liquid is initially contained in the supply tank 30 and that it is desired to flood the space 13 in order to reduce the transmission of heat and/or light through the window. To effect such flooding, the valves 33 and 39 are opened and the valves 34 and 37 are closed. Thus, operation of the compressor 31 results in pressurization of the supply tank 30 so that the liquid therein is forced through the line 20 and into the manifold 15. Such liquid flows into the lower branch 17 and then part of the liquid enters the space 13 through the inlet slots 23. At the same time, liquid flows into the side branches 18 and 19 and subsequently enters the upper branch 16. The level of the liquid in the side branches rises at approximately the same rate as the level of the liquid in the space 13.

As the liquid enters into and gradually rises within the space 13, the air in the upper end of the space is expelled therefrom through the outlet tubes 24 and thence through the side branches 18 and 19 and the upper branch 16. With the valve 39 being open, such air ultimately is bled off to atmosphere through the vent line 40.

Because the outlet tubes 24 enable exhaustion of the air from the space 13 and because of the construction of the manifold 15, the pressure of the air in the space, the weight or pressure of the liquid and the external pressure exerted on the liquid are in virtual balance and thus the total pressure is substantially uniformly distributed over the entire area of each pane 11. Accordingly, the space 13 may be filled with liquid without danger of the pressure breaking the panes. Also, very little bubble formation occurs since any air within the liquid is vented to atmosphere through the outlet tubes 24.

When the space 13 is completely filled, any additional liquid which is supplied to the lower branch 17 simply flows through the side branches 18 and 19 and the upper branch 16 to the overflow tank 36. Thus, the side branches and the upper branch prevent the build up of excessive pressure within the space 13 and avoid the need for cutting off the flow of liquid at the precise time that the space is completely filled. After the space has been filled, the compressor 31 may be shut down and the valves 33 and 39 may be closed so as to prevent drainage of the liquid from the space.

When it is desired to exhaust the space 13, the valves 34 and 37 are opened. Thus, operation of the compressor 31 results in pressurization of the overflow tank 36 to force the liquid therein into the upper branch 16 of the manifold 15. The pressure is transmitted to the liquid in the space 13 and thus such liquid flows reversely through the inlet slots 23 by virtue of the applied pressure as well as by gravity. The liquid in the line 21 and the upper branch 16 of the manifold flows downwardly through the side branches 18 and 19 and, for the most part, none of such liquid enters the space 13. That is, the beveled outer ends 25 of the tubes 24 restrict the flow of liquid through the tubes and into the space 13 since the upper portions of the beveled ends tend to deflect the returning liquid downwardly around the tubes and into the lower portions of the side branches 18 and 19 rather than allowing the liquid to flow inwardly through the tubes and into the space. Accordingly, the surplus liquid in the overflow tank 36, the line 21 and the upper branch 16 is returned to the lower branch 17 by way of the side branches 18 and 19 and does not trickle downwardly within the space and along the inner sides of the panes 11. The space 13 can, therefore, be completely exhausted and the panes can be rendered free of liquid in a relatively short period of time.

I claim:

1. A window comprising a pair of upright panes made of transparent material and disposed in spaced face-to-face relation whereby a space is defined between said panes, means extending around said panes and establishing a liquid-tight seal around said space, a liquid supply manifold disposed within said space, said manifold comprising upper and lower tubular branches disposed adjacent the upper and lower margins, respectively, of said panes and further comprising two upright tubular branches disposed adjacent the left and right side margins of said panes and each establishing communication between said upper branch and said lower branch, liquid inlet means opening out of said lower branch and communicating with said space, gas outlet means in the upper end portions of said upright brances and establishing communication between said space and said upright branches, a supply reservoir containing liquid and communicating with said lower branch, an overflow reservoir communicating with said upper branch, means for selectively pressurizing said liquid to deliver said liquid from said supply reservoir to said manifold with said liquid flowing into said space by way of said inlet means and flowing to said upper branch and thence to said overflow reservoir by way of said upright branches, the gas in said space being expelled from said space through said outlet means and said upper branch as liquid enters said space through said inlet means, and means for selectively pressurizing said overflow reservoir and said space to return liquid to said supply reservoir, the liquid from said overflow reservoir flowing into said upper branch and through at least one of said upright branches to said lower branch and then flowing to said supply reservoir, the liquid from said space returning to said lower branch by way of said inlet means and then flowing to said supply reservoir.

2. A window comprising a pair of upright panes made of transparent material and disposed in spaced face-to-face relation whereby a space is defined between said panes, means extending around said panes and establishing a liquid-tight seal around said space, a liquid supply manifold disposed within said space, said manifold comprising upper and lower tubular branches disposed adjacent the top and bottom portions, respectively, of said space and further comprising an upright tubular branch disposed adjacent one side portion of said space and establishing communication between said upper and lower branches, liquid inlet means opening out of said lower branch and communicating with said space, gas outlet means in the upper end portion of said upright branch and establishing communication between said space and said upright branch, a supply reservoir containing liquid and communicating with said lower branch, an overflow reservoir communicating with said upper branch, selectively operable means for delivering liquid from said supply reservoir to said manifold with said liquid flowing into said space by way of said inlet means and flowing to said upper branch and thence to said overflow reservoir by way of said upright branch, the gas in said space being expelled therefrom through said outlet means and said upper branch as liquid enters said space through said inlet means, and selectively operable means for causing liquid to be returned from said overflow reservoir and said space to said supply reservoir, the liquid from said overflow reservoir flowing into said upper branch and then through said side branch to said lower branch and then flowing to said supply reservoir, the liquid in said space returning to said lower branch by way of said inlet means and then flowing to said supply reservoir.

3. A window as defined in claim 2 in which said gas outlet means comprises a tube projecting into the interior of said upright branch and having an inner end communicating with said space, the outer end of said tube being shaped to allow gas to flow through said tube and into said upper branch but to restrict liquid from flowing from said upper branch and into said space by way of said tube.

4. A window as defined in claim 3 in which the outer end of said tube is beveled downwardly and inwardly whereby the upper side of said outer end deflects liquid from said upper branch around said tube and restricts the flow of liquid into the tube.

5. A window as defined in claim 2 further including vents leading from said supply reservoir and said overflow reservoir, and means for selectively opening and closing each of said vents.

* * * * *